United States Patent
Collister et al.

(10) Patent No.: US 11,543,283 B2
(45) Date of Patent: Jan. 3, 2023

(54) FLOW METERING SYSTEM CONDITION-BASED MONITORING AND FAILURE TO PREDICTIVE MODE

(71) Applicant: Emerson Automation Solutions Measurement Systems & Services LLC, Houston, TX (US)

(72) Inventors: Gary Thomson Collister, Stirling (GB); Christudas Philipose Anchuturuthen, Maharashtra (IN); Bharatkumar Bhupal Patil, Maharashtra (IN)

(73) Assignee: Emerson Automation Solutions Measurement Systems & Services LLC, Houston, TX (US)

( * ) Notice: Subject to any disclaimer, the term of this patent is extended or adjusted under 35 U.S.C. 154(b) by 148 days.

(21) Appl. No.: 16/695,488

(22) Filed: Nov. 26, 2019

(65) Prior Publication Data
US 2020/0166398 A1    May 28, 2020

(30) Foreign Application Priority Data
Nov. 26, 2018   (IN) .............................. 201811044537

(51) Int. Cl.
*G01F 25/10*   (2022.01)
*F17D 3/01*    (2006.01)
*G06N 20/00*   (2019.01)

(52) U.S. Cl.
CPC ............... *G01F 25/10* (2022.01); *F17D 3/01* (2013.01); *G06N 20/00* (2019.01)

(58) Field of Classification Search
CPC ........ G01F 25/0007; F17D 3/01; G06N 20/00
See application file for complete search history.

(56) References Cited

U.S. PATENT DOCUMENTS

| | | |
|---|---|---|
| 7,581,434 B1 | 9/2009 | Discenzo et al. |
| 2005/0011278 A1 | 1/2005 | Brown et al. |
| 2007/0257806 A1 | 11/2007 | Madden et al. |
| (Continued) | | |

FOREIGN PATENT DOCUMENTS

KR    1020140111396 A    9/2014

OTHER PUBLICATIONS

International Search Report and Written Opinion dated Mar. 23, 2020 for Application No. PCT/US2019/063190.
(Continued)

*Primary Examiner* — Manuel A Rivera Vargas
(74) *Attorney, Agent, or Firm* — The Ollila Law Group LLC

(57) ABSTRACT

A flow metering system includes a flow meter coupled to a plurality of sensors and configured to measure volume of fluid flowing through the flow meter. The system also includes a metrology computer coupled to the flow meter and the sensors. The metrology computer is configured to receive live values from a plurality of sensors during a first time period, train an artificial intelligence engine based on the live values received during the first time period, and detect a sensor failure based on a deviation between a live value from the sensor and a predicted value for the sensor. The predicted value is based on live values from other of the plurality of sensors and the artificial intelligence engine.

8 Claims, 8 Drawing Sheets

(56) References Cited

U.S. PATENT DOCUMENTS

2011/0139509 A1* 6/2011 Pool .................. E21B 21/08
                                                    175/50
2011/0314331 A1* 12/2011 Beach ................ G06F 11/0739
                                                    714/26

OTHER PUBLICATIONS

Yiqi Liu et al: "A Seva soft sensor method based on self-calibration model and uncertainty description algorithm", Chemometrics and Intelligent Laboratory Systems, Elsevier Science Publishers B.V. Amsterdam, NL, vol. 126, Apr. 28, 2013 (Apr. 28, 2013), pp. 38-49, XP028569839, ISSN: 0169-7439, DOI: 10.1016/J.CHEMOLAB. 2013.04.009.

* cited by examiner

FLOW METERING SYSTEM CONDITION-BASED MONITORING AND FAILURE TO PREDICTIVE MODE

CROSS-REFERENCE TO RELATED APPLICATIONS

The present application claims priority to Indian provisional patent application No. 201811044537 filed on Nov. 26, 2018, and entitled "Flow Metering System Condition-Based Monitoring and Failure to Predictive Mode" which is incorporated herein by reference in its entirety.

BACKGROUND

Hydrocarbon fluids are transported from place-to-place via pipelines. It is desirable to know with accuracy the amount of fluid flowing in the pipeline, and particular accuracy is demanded when the fluid is changing hands, or "custody transfer." Custody transfer can occur at a fluid fiscal transfer measurement station or skid, which may include key transfer components such as a measurement device or flow meter, a proving device, associated pipes and valves, and electrical controls. Even where custody transfer is not taking place, however, measurement accuracy is desirable, and in these situations, flow meters may be used.

Ultrasonic, Coriolis, and orifice flow meters are examples of flow meters that may be used to measure the amount of fluid flowing in a pipeline. These flow meters have sufficient accuracy to be used in custody transfer. Ancillary devices used in the calculation of custody transfer totals include temperature, pressure and density sensors and gas chromatographs.

Flow metering systems are subject to various conditions that affect the calibration, accuracy, and/or operation of the metering system. For example, accumulation of contaminants in the pipeline, flow restrictions, and/or differences or changes in operating environment with respect to calibration environment may affect flow meter accuracy. Accordingly, effective techniques for monitoring conditions related to flow meter operation and accuracy are desirable.

SUMMARY

In accordance with at least one example of the disclosure, a flow metering system includes a flow meter coupled to a plurality of sensors and configured to measure volume of fluid flowing through the flow meter; and a metrology computer coupled to the flow meter and the sensors. The metrology computer is configured to receive live values from a plurality of sensors during a first time period; train an artificial intelligence engine based on the live values received during the first time period; and detect a sensor failure based on a deviation between a live value from the sensor and a predicted value for the sensor. The predicted value is based on live values from other of the plurality of sensors and the artificial intelligence engine.

In accordance with another example of the disclosure, a method for monitoring operation of a flow meter includes receiving live values from a plurality of sensors during a first time period; training an artificial intelligence engine based on the live values received during the first time period; and detecting a sensor failure based on a deviation between a live value from the sensor and a predicted value for the sensor. The predicted value is based on live values from other of the plurality of sensors and the artificial intelligence engine.

In accordance with yet another example of the disclosure, a flow metering system includes a flow meter coupled to a plurality of sensors and configured to measure volume of fluid flowing through the flow meter; and a metrology computer coupled to the flow meter and the sensors. The metrology computer is configured to receive live values from a plurality of sensors during a first time period; train an artificial intelligence engine based on the live values received during the first time period; in response to detecting a sensor failure, determine an uncertainty of a predicted value for the sensor, wherein the predicted value is based on live values from other of the plurality of sensors and the artificial intelligence engine; and in response to the uncertainty being below a threshold, use the predicted value in a flow calculation.

In accordance with still another example of the disclosure, a method for monitoring operation of a flow meter includes receiving live values from a plurality of sensors during a first time period; training an artificial intelligence engine based on the live values received during the first time period; in response to detecting a sensor failure, determining an uncertainty of a predicted value for the sensor, wherein the predicted value is based on live values from other of the plurality of sensors and the artificial intelligence engine; and in response to the uncertainty being below a threshold, using, by the metrology computer, the predicted value in a flow calculation.

BRIEF DESCRIPTION OF THE DRAWINGS

For a detailed description of exemplary embodiments of the invention, reference will now be made to the accompanying drawings in which.

NOTATION AND NOMENCLATURE

Figure 1A:
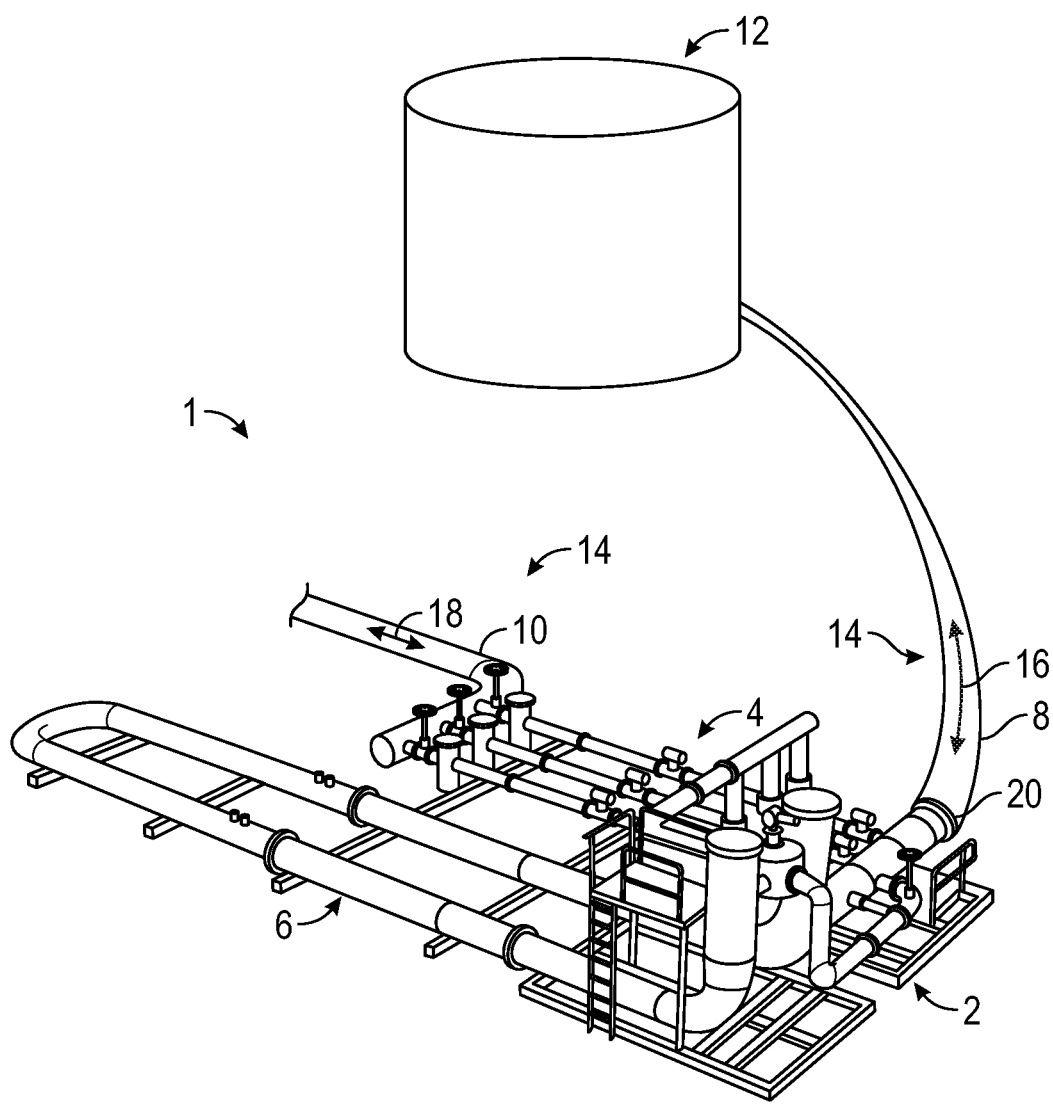
FIG. 1a is a system having a flow meter measurement station in accordance with various embodiments.

In the following discussion and in the claims, the terms "including" and "comprising" are used in an open-ended fashion, and thus should be interpreted to mean "including, but not limited to . . . ." In addition, the term "couple" or "couples" is intended to mean either an indirect or a direct electrical connection. Thus, if a first device couples to a second device, that connection may be through a direct electrical connection, or through an indirect electrical connection accomplished via other devices and connections. Further, the term "software" includes any executable code capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of other factors. The term "fluid" includes liquids and gases.

DETAILED DESCRIPTION

The following description is directed to various exemplary embodiments of the invention. The drawing figures are not necessarily to scale. Certain features of the embodiments may be shown exaggerated in scale or in somewhat schematic form and some details of conventional elements may not be shown in the interest of clarity and conciseness. The disclosed embodiments should not be interpreted, or otherwise used, to limit the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment. It is to be fully recognized that the different teachings of the embodiments discussed below may be employed separately or in any suitable combination to produce desired results. Further, the various embodiments were developed in the context of measuring hydrocarbon flows (e.g., crude oil, natural gas), and the description follows from the developmental context; however, the systems and methods described are equally applicable to measurement of any fluid flow.

Flow metering systems include flow computers to determine an amount of fluid that has passed through, for example, a pipeline, and condition monitors (e.g., condition-based monitoring systems) to enable detection of changes in metering system operation and/or system operating conditions, and correction of conditions causing the changes. A flow meter condition monitor is a system that monitors the operation of the flow meter and associated instrumentation. In the example of an ultrasonic flow meter, a condition monitor may analyze the operation of the metering system by performing exemplary functions such as:

- detection of changes in flow characteristics such as flow profile, flow symmetry, flow swirl, flow turbulence, etc.
- detection of changes in results of meter diagnostics such as error rate in the detection of signals, gain levels, noise levels, peakswitch detection, tube stiffness etc.
- comparison of similar measurements from other sources, for example the measured speed of sound from the ultrasonic flow meter to gas composition, pressure and temperature using the American Gas Association (AGA) 10 standard;
- comparison of measured temperature against temperature derived from the speed of sound; and
- comparison of density derived from a gas composition sensor (e.g., a gas chromatograph) to density derived from speed of sound.

More generally, conventional condition monitors may track device performance against an established benchmark (e.g., a calibrated value) over time, and raise an alert if a deviation above a threshold is detected.

Conventional condition-based monitoring systems perform comparisons on parameter values generated by sensors in series or in parallel runs on a metering skid. If the comparison of parameter values results in a calculated deviation value that is outside of a limit (e.g., an operator-specified limit) then an alert may be raised. However, although conventional condition-based monitoring systems may identify a deviation between sensor values outside of a tolerable limit, indicating that one sensor may be malfunctioning, these systems are unable to identify which sensor is malfunctioning. Device specific condition monitoring systems may be able to identify more specific sources of a malfunction, but are unable to take a holistic view of the measurement system and cross-compare all correlated measurements.

Further, in the event of a sensor malfunction, or in the event of a loss of data between a sensor and a flow computer (generally referred to as a sensor failure), the measurement system or flow computer may have one of two failure modes. A first failure mode is fail to an operator-defined value. In this mode, upon the detection of a sensor failure, an operator-defined value is used in lieu of a live value from the failed sensor. A second failure mode is failed to a last good value. In this mode, upon the detection of a sensor failure, the last value from the sensor prior to the sensor failure is used in lieu of a live value from the failed sensor. However, each of these failure modes substitutes a static value, either defined by the operator or the last good value from a failed sensor, for use in a computation that is inherently dynamic in nature. That is, a static failure value is used while the ongoing flow monitoring process remains dynamic in nature, leading to potential inaccuracies in flow calculations, and necessitating generation of a mismeasurement report, which is time-consuming and costly. Further, at least in the case of using the last good value, the sensor may have drifted toward failure over time, resulting in last good value that contains significant uncertainty, and thus may be only minimally better than the failed limit value itself.

To address the foregoing deficiencies and conventional flow monitoring systems, a metrology engine leverages artificial intelligence and neural networks to identify a sensor failure and/or to predict sensor values for the failed sensor based on live values from other, healthy sensors. The metrology engine may exist on a flow computer coupled to the sensors, which include a flow meter in some examples. Other sensors may include, without limitation, temperature sensors, pressure sensors, gas chromatographs, densitometers, and other various sensors used for flow monitoring and measurement. The metrology engine may also exist on a computer or virtual device remote from the flow monitoring system's physical location, for example at a central office of a customer utilizing the flow monitoring system.

In particular, the metrology engine includes an artificial intelligence engine that employs a deep learning model (e.g., a multilayer neural network) to facilitate machine learning to generate a predicted value for a sensor (e.g., a failed sensor) based on live values received from other, healthy sensors. During initial operation at a particular site, various data gathered from the sensors of the flow monitoring system are used to train the artificial intelligence engine, allowing the artificial intelligence engine to learn the site-specific relationships between sensor parameters. During this initial training period, other configuration data may be provided to the artificial intelligence engine, for example data entered by a user. The configuration data may include sensor types, sensor locations, and a number of flow streams. The configuration data, in addition to the live values gathered from the sensors during operation, allows training the artificial intelligence engine for the particulars of its site installation.

During operation of the flow monitoring system, the metrology engine receives live values from the flow meter and other associated sensors. At the same time, the metrology engine also generates predicted values for the flow meter and associated sensors using the now-trained artificial intelligence engine. The metrology engine compares the live value for a sensor with the predicted value for that sensor. If the live value differs from the predicted value by more than a deviation limit, a predicted failure is detected. The deviation limit may be a user-configurable value, or may be determined by the artificial intelligence engine, for example during training of the artificial intelligence engine. As a result of a predicted failure being detected, remedial action may be taken such as scheduling maintenance of the sensor, ordering a replacement sensor, and/or replacing the sensor.

A predicted sensor failure may also be detected by using a deep learning model (e.g., a recurrent neural network) to analyze historical live sensor values and predict a trend in sensor values into the future. For example, an artificial intelligence engine may determine that, based on the temperature and other sensor values over the past week, a particular sensor may be subject to malfunction or failure in the coming two weeks, and thus preventative maintenance should be undertaken. The historical time period considered by the artificial intelligence engine takes is variable (e.g., the past 1 month, 1 week, 1 day, or 1 hour). The artificial intelligence engine may also determine, based on alerts and/or other events during the past variable time period, that previous training indicates that a sensor failure is likely to occur in the coming variable time period as a result of the particular set of alerts and/or other events are observed to occur.

Regardless of whether a sensor failure is detected using the artificial intelligence engine—that is, even in situations where a sensor failure is detected conventionally such as detecting an error code, or receiving live values outside of a tolerable range for that sensor or sensor type—the predicted value generated by the artificial intelligence engine may be used for subsequent flow calculations. This avoids the need for failing to a user-defined value or failing to a last good value, which can be problematic as described above. For example, if a temperature sensor on a first stream failed, the artificial intelligence engine predicts a value for that temperature sensor based on the remaining live values from sensors coupled to the artificial intelligence engine. The predicted value for that temperature sensor could then be used by the flow computer for flow calculations.

In situations where a predicted value for a sensor can be used in flow calculations, urgent maintenance may be avoided, and a mismeasurement report may not be required. On the other hand, if the predicted value for the sensor or a historical prediction algorithm is not within an allowable uncertainty, for example based on a historical uncertainty calculation result, failing to a user-defined value or failing to a last good value may be required. In this case, remedial action may be taken, such as scheduling maintenance, ordering a replacement sensor, and/or replacing the sensor. Further, a mismeasurement report may be generated.

FIG. 1a shows a measurement system 1. A measurement station or skid 2 includes a measurement device or flow meter 4 and a prover 6. The flow meter 4 may be part of a larger measurement unit further having associated equipment and components 14. A first pipeline 8 contains a first fluid stream 16 wherein a fluid is flowing to or from a first container or source 12. The pipeline 8 connects to the flow meter 4. A second pipeline 10 contains a second fluid stream 18 wherein a fluid is flowing to or from a second container or source distant from the skid 2. The skid 2 executes custody transfer measurements.

Figure 1B:
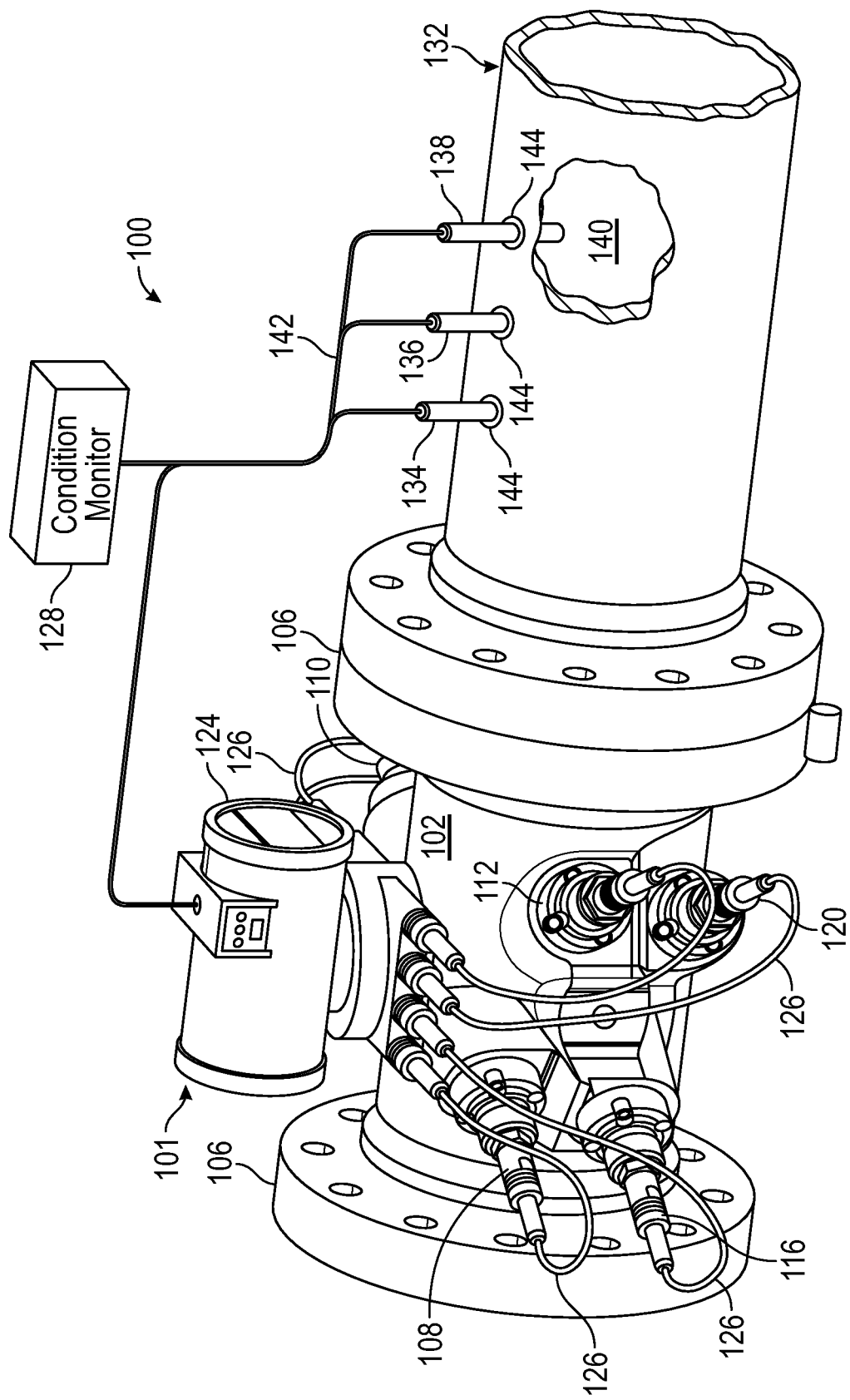
FIG. 1b shows an ultrasonic flow metering system in accordance with various embodiments.

FIG. 1b shows an ultrasonic flow metering system 100 in accordance with various examples. The system 100 includes an ultrasonic flow meter 101, sensors 134, 136, 138, and a metrology engine 128. Although the example of FIG. 1b depicts an ultrasonic flow meter, other examples may utilize different type of flow meters. All such examples are within the scope of this disclosure. In the system 100, the ultrasonic flow meter 101 is coupled to a pipe or other structure 132, such as a portion of the measurement skid 2 shown in FIG. 1a. In some examples, the pipe 132 is disposed downstream of the ultrasonic flow meter 101. The pipe 132 includes openings 144 that allow sensors 134-138 to access the fluid stream flowing through the system 100. The metrology engine 128 is coupled to the sensors 134-138 and to the ultrasonic meter 101. In some examples, the metrology engine 128 may be part of a flow computer coupled to the ultrasonic meter 101. In other examples, the metrology engine 128 may be integrated with electronics 124 of the ultrasonic meter 101, or implemented as a discrete computing device.

The ultrasonic flow meter 101 includes a meter body or spool piece 102 that defines a central passage or bore. The spool piece 102 is designed and constructed to be coupled to a pipeline or other structure carrying fluids (e.g., natural gas) such that the fluids flowing in the pipeline travel through the central bore. While the fluids travel through the central bore, the ultrasonic flow meter 101 measures the flow rate (hence, the fluid may be referred to as the measured fluid). The spool piece 102 includes flanges 106 that facilitate coupling of the spool piece 102 to another structure. In other examples, any suitable system for coupling the spool piece 102 to a structure may be equivalently used (e.g., weld connections).

In order to measure fluid flow within the spool piece 102, the ultrasonic flow meter 101 includes a plurality of transducer assemblies. In the view of FIG. 1, five such transducers assemblies 108, 110, 112, 116 and 120 are in full or partial view. The transducer assemblies are paired (e.g., transducer assemblies 108 and 110), as will be further discussed below. Moreover, each transducer assembly electrically couples to control electronics package 124. More particularly, each transducer assembly is electrically coupled to the control electronics package 124 by way of a respective cable 126 or equivalent signal conducting assembly.

Figure 2:
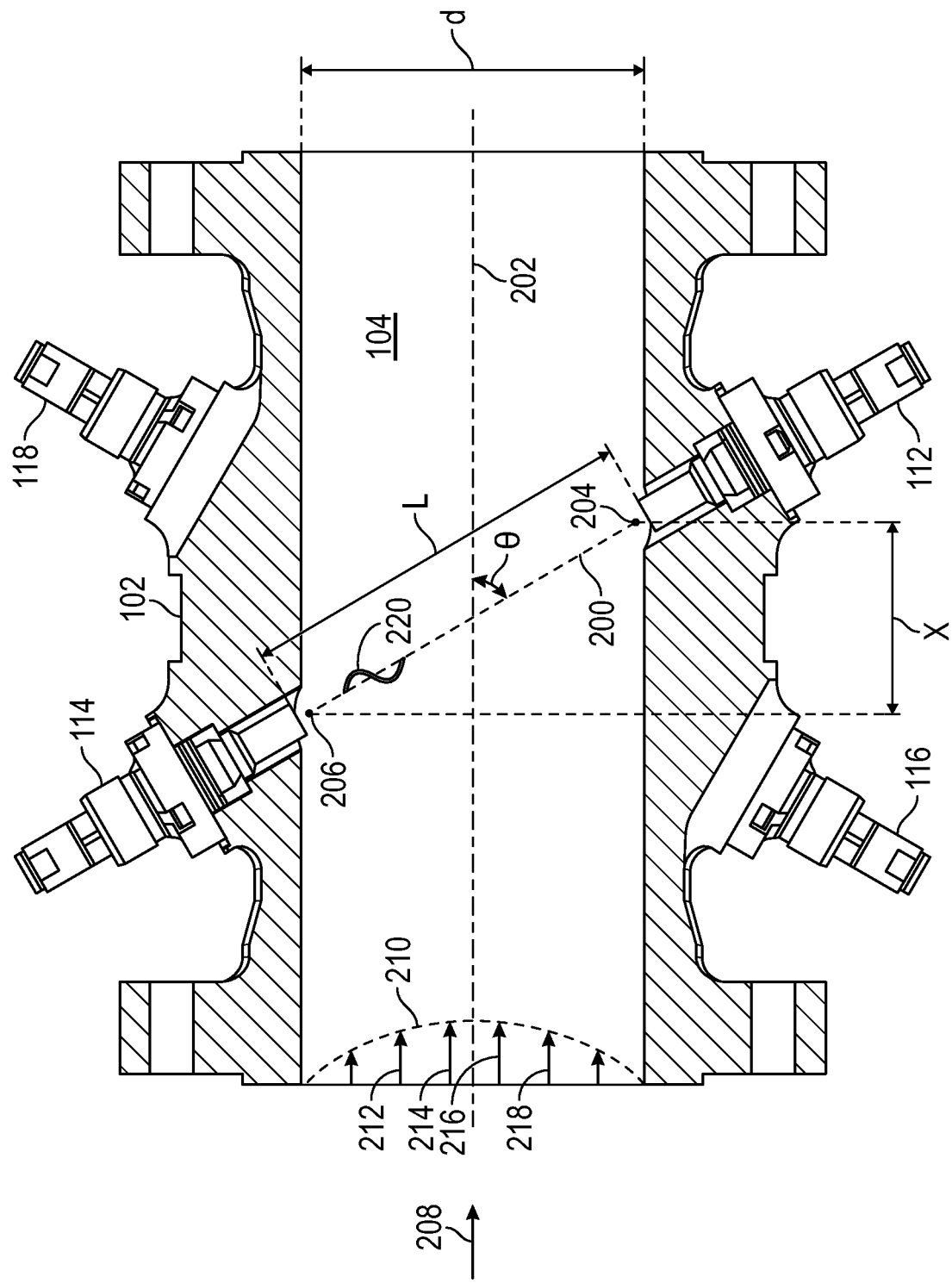
FIG. 2 shows a cross-sectional overhead view of an ultrasonic flow meter in accordance with various embodiments.

FIG. 2 shows a cross-sectional overhead view of the ultrasonic flow meter 101. Spool piece 102 has a predetermined size and defines the central bore 104 through which the measured fluid flows. An illustrative pair of transducers assemblies 112 and 114 is located along the length of spool piece 102. Transducers 112 and 114 are acoustic transceivers, and more particularly ultrasonic transceivers. The ultrasonic transducers 112, 114 both generate and receive acoustic signals having frequencies above about 20 kilohertz. The acoustic signals may be generated and received by a piezoelectric element in each transducer. To generate an ultrasonic signal, the piezoelectric element is stimulated electrically by way of a signal (e.g., a sinusoidal signal), and the element responds by vibrating. The vibration of the piezoelectric element generates the acoustic signal that travels through the measured fluid to the corresponding transducer assembly of the pair. Similarly, upon being struck by an acoustic signal, the receiving piezoelectric element vibrates and generates an electrical signal (e.g., a sinusoidal signal) that is detected, digitized, and analyzed by the electronics 124 associated with the flow meter 101.

A path 200, also referred to as a "chord," exists between illustrative transducer assemblies 112 and 114 at an angle θ to a centerline 202. The length of chord 200 is the distance between the face of transducer assembly 112 and the face of transducer assembly 114. Points 204 and 206 define the locations where acoustic signals generated by transducer assemblies 112 and 114 enter and leave fluid flowing through the spool piece 102 (i.e., the entrance to the spool piece bore). The position of transducer assemblies 112 and 114 may be defined by the angle θ, by a first length L measured between the faces of the transducer assemblies 112 and 114, a second length X corresponding to the axial distance between points 204 and 206, and a third length d corresponding to the pipe inside diameter. In most cases, distances d, X, and L are precisely determined during flow meter fabrication. A measured fluid, such as natural gas, flows in a direction 208 with a velocity profile 210. Velocity vectors 212, 214, 216 and 218 illustrate that the gas velocity through spool piece 102 increases toward the centerline 202 of the spool piece 102.

Initially, downstream transducer assembly 112 generates an ultrasonic signal that is incident upon, and thus detected by, upstream transducer assembly 114. Sometime later, the upstream transducer assembly 114 generates a return ultrasonic signal that is subsequently incident upon, and detected by, the downstream transducer assembly 112. Thus, the transducer assemblies exchange or play "pitch and catch" with ultrasonic signals 220 along chordal path 200. During operation, this sequence may occur thousands of times per minute.

The transit time of an ultrasonic signal 220 between illustrative transducer assemblies 112 and 114 depends in part upon whether the ultrasonic signal 220 is traveling upstream or downstream with respect to the fluid flow. The transit time for an ultrasonic signal traveling downstream (i.e., in the same direction as the fluid flow) is less than its transit time when traveling upstream (i.e., against the fluid flow). The upstream and downstream transit times can be used to calculate the average velocity along the signal path, and the speed of sound in the measured fluid. Given the cross-sectional measurements of the flow meter 101 carrying the fluid, the average velocity over the area of the central bore 104 may be used to find the volume of fluid flowing through the spool piece 102.

Ultrasonic flow meters can have one or more chords. For example, the flow meter 101 includes four chordal paths at varying elevations within the spool piece 102. The flow velocity of the fluid may be determined at each chord to obtain chordal flow velocities, and the chordal flow velocities combined to determine an average flow velocity over the entire pipe. From the average flow velocity, the amount of fluid flowing in the spool piece, and thus the pipeline, may be determined.

Typically, the control electronics 124 causes the transducers (e.g., 112, 114) to fire and receives output signals from the transducers. The control electronics 124 may also compute the mean flow velocity for each chord, compute the mean flow velocity for the meter, compute the volumetric flow rate through the meter, compute speed of sound through the fluid, perform meter diagnostics, etc. The volumetric flow rate and other measured and computed values, such as flow velocity, speed of sound, etc. may be output to the metrology engine 128. As noted above, the metrology engine 128 may be included in the control electronics 124 in some examples.

For a given chord, the chordal flow velocity v is given by:

$$v = \frac{L^2}{2X} \cdot \frac{T_{up} - T_{dn}}{T_{up}T_{dn}}, \quad (2)$$

and the chordal speed of sound c is given by:

$$c = \frac{L}{2} \cdot \frac{T_{up} + T_{dn}}{T_{up}T_{dn}} \quad (3)$$

where:
L is the path length (i.e., face-to-face separation between upstream and downstream transducers),
X is the component of L within the meter bore in the direction of the flow, and
$T_{up}$ and $T_{dn}$ are the upstream and downstream transit times of sound energy through the fluid.

The average flow velocity through the meter 101 is given by:

$$v_{avg} = \sum_i w_i v_i \quad (4)$$

where:
$w_i$ is a chordal weighting factor,
$v_i$ is the measured chordal flow velocity, and
the summation i is over all chords.

Returning now to FIG. 1b, the sensors 134-138 measure various attributes or parameters of the fluid, and may provide the measurements to the metrology engine 128 via signal conduction media 142 (e.g., wiring). The sensor 134 is a gas composition sensor, such as a gas chromatograph, that provides information indicative of the amount of each constituent of the gas flowing through the system 100. The sensor 136 is a pressure sensor that provides signals indicative of the pressure of the fluid flowing in the system 100. The sensor 138 is a temperature sensor (e.g., a resistance temperature detector) that provides signals indicative of the temperature of the fluid flowing through the system 100. The temperature sensor 138 extends into the interior passage 140 of the pipe 132, and measures the temperature of the fluid flowing through the system 100 at the terminus of sensor 138. Thus, the temperature sensor 138 is positioned to measure the temperature of the fluid at a specific elevation.

From the fluid composition, pressure, and temperature information provided by sensors 134, 136, and 138 respectively, the speed of sound through the fluid stream can be computed using predetermined theoretical or experimental values. For example, the metrology engine 128 may compute speed of sound in the fluid as specified in American Gas Association Report No. 10, "Speed of Sound in Natural Gas and Other Related Hydrocarbons" (AGA 10). Some examples of the metrology engine 128 may use this computed speed of sound to verify the speed of sound values measured for each chord of the meter 101.

Similarly, based on the speed of sound measurements provided by the ultrasonic flow meter 101 and the measurements provided by the sensors 134, 136, the metrology engine 128 can compute the temperature, pressure, and/or composition of the fluid flowing through the ultrasonic metering system 100. The metrology engine 128 may compute temperature, pressure, and/or composition using an iterative reverse of the speed of sound computation specified by AGA 10 based on the measured speed of sound provided by the ultrasonic meter 101 and measurements provided by the sensors 134-136.

As explained above, a metrology engine (e.g., metrology engine 128) is configured to receive live values from a plurality of sensors including a flow meter during operation of a flow metering system. The metrology engine uses those live values to train an artificial intelligence engine. The metrology engine is then able to detect a sensor failure when a deviation between a live value from a sensor and a predicted value (i.e., from the artificial intelligence engine) for that sensor based on live values from other sensors. For example, if the deviation exceeds a tolerable limit, that sensor may be deemed to have failed, or be experiencing an impending failure. Further, regardless of how a sensor failure is detected, the metrology engine may also use the predicted value (i.e., from the artificial intelligence engine) in a flow calculation if a sensor has failed, but it is determined that an uncertainty for the predicted value for that sensor is below an allowable amount of uncertainty.

Figure 3:
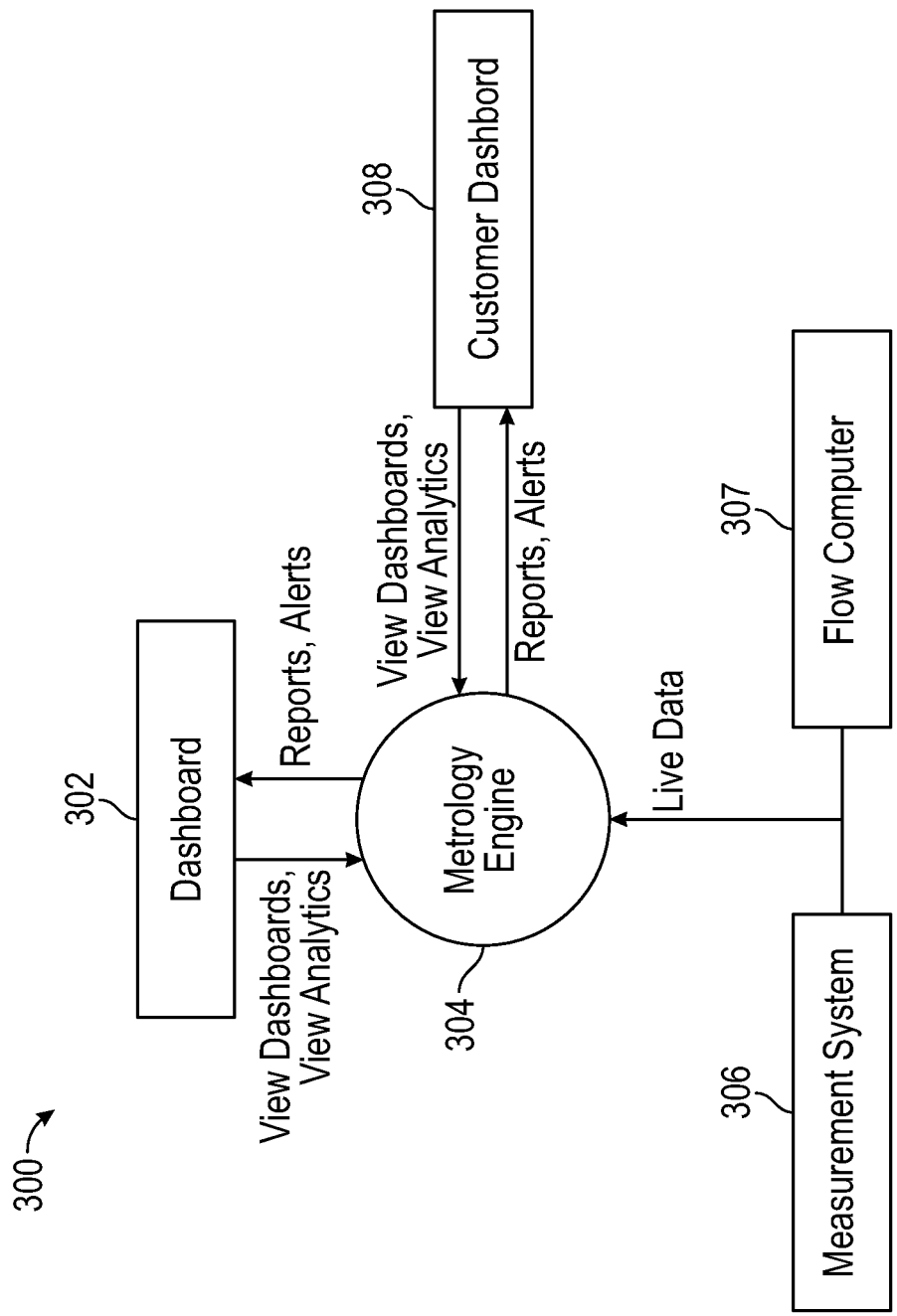
FIG. 3 shows a block diagram of a system for condition monitoring and failure to a predictive mode in accordance with various embodiments.

FIG. 3 shows a block diagram of a system 300 in accordance with examples of the present disclosure. The system 300 includes a metrology engine 304, which is coupled to a measurement system 306 and flow computer 307, and one or more dashboards 302, 308. The metrology engine 304 may comprise software that is executed by one or more processors, and may be implemented on a physical computing device, a virtual machine, or other computing platform.

The measurement system 306 comprises a flow meter and associated sensors of a flow monitoring system, such as flow meter 101 and sensors 134, 136, 138 shown in and described above with respect to FIG. 1b. The measurement system 306 is coupled to the flow computer 307, which performs flow calculations on data received from the measurement system 306. The measurement system 306 and/or the flow computer 307 provides live values from the flow meter and associated sensors to the metrology engine 304.

The dashboards 302, 308 allow users, potentially in different locations, to view information about the flow monitoring system, analytics related to historical operation of the flow monitoring system, and the like. The dashboards 302, 308 also allow users to generate reports relating to the operation of the flow monitoring system and to receive alerts relating to the operation of the flow monitoring system. The dashboards 302, 308 also provide trending and visualization capability to monitor live and predicted values over time, overlaid with pertinent additional information such as alerts and events and a quantifiable indication of the accuracy of the predictions against the live values. The dashboards 302, 308 further allow access to a configuration editor for an artificial intelligence engine of the metrology engine 304. The configuration editor allows users to select which parameters to monitor and specify the architecture and key parameters of the neural network, such as the number of input nodes, the number and composition of the hidden layers, and the format of the outputs. The dashboards 302, 308 may allow for viewing on any number of computing devices, including computing devices co-located with the flow monitoring system as well as computing devices remote from the flow monitoring system. For example, a customer dashboard 308 may exist at a customer's central office, and allow interaction with flow monitoring systems at multiple, geographically disparate sites.

Figure 4:
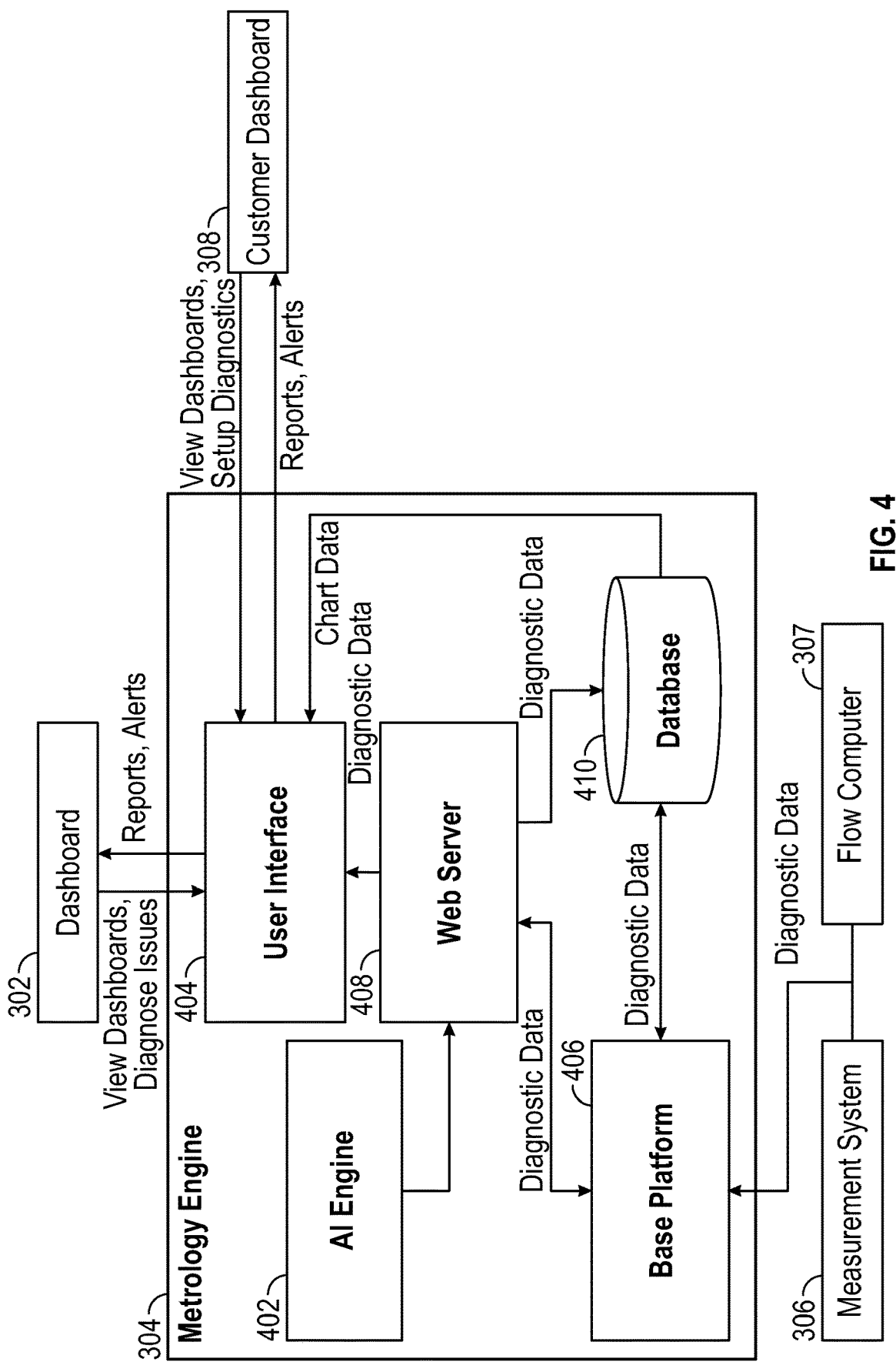
FIG. 4 shows the metrology engine of FIG. 3 in further detail, and in accordance with various embodiments.

FIG. 4 shows the metrology engine 304 in greater detail. In particular, the metrology engine includes an artificial intelligence engine 402, a user interface engine 404, a base software platform 406, a web server 408, and a database 410. The connections shown in FIG. 4 are illustrative of one exemplary topology for the metrology engine 304, but any component of the metrology engine 304 may communicate, direct, access, or otherwise engage with any other component of the metrology engine 304 in various examples.

The artificial intelligence engine 402 receives live values from various sensors of the measurement system 306, in this case by way of the base platform 406 communicating with the web server 408. During an initial period of operation of the flow monitoring system, the artificial intelligence engine 402 trains itself using a neural network and machine learning to identify relationships between values from the various sensors of the flow monitoring system. Although training of the artificial intelligence engine 402 may continue past the initial period of operation, once the initial period of operation is complete, the artificial intelligence engine 402 generates predicted values for each of the sensors based on live values received from the other sensors of the measurement system 306.

The user interface engine 404 receives information from the web server 408, for example related to operation of the flow monitoring system, conditions of the flow monitoring system, calculations related to flow monitoring, and other parameters related to the flow monitoring system and provides this information to the dashboards 302, 308 for viewing and access by users. The user interface 404 may also receive requests and commands from the end-user dashboards 302, 308.

The web server 408 serves as an interface between the artificial intelligence engine 402 and the measurement system 306. In particular, the web server 408 provides live values from sensors of the measurement system 306 to the artificial intelligence engine 402, and receives predicted values from the artificial intelligence engine 402 based on those live values.

The base platform 406 communicates with the flow computer 307 coupled to the measurement system 306, to create periodic production and flow analytics reports for an end-user. In some examples, the base platform 406 may perform additional diagnostic functions such as comparing values against parallel sensors or historic benchmarks. The base platform 406 may also implement logic that calculates uncertainty of predicted values received from the artificial intelligence engine 402 by way of the web server engine 408 and may provide the predicted value from the artificial intelligence engine 402 to the flow computer for use in flow calculations.

In some examples, the calculation of uncertainty may be performed in accordance with an international standard such as ISO/IEC Guide 98 (1995), Guide to the expression of uncertainty in measurement (GUM) and ISO 5168:2005, Measurement of fluid flow—procedures for the evaluation of uncertainties. The following exemplary method calculates the system uncertainty using root sum squared combination, although alternative methods such as a Monte Carlo simulation and others are also within the scope of this disclosure.

1. Identify and define relationships between system inputs (e.g., pressure data, temperature data, flow computer data, densitometer data) and the final measurement (e.g., amount/volume of fluid transferred).
2. Create a list of all the factors that will influence the uncertainty of the final measurement.
3. Estimate the magnitude of uncertainty for each factor in the list.
4. Taking each relationship from step 1, estimate the effect that each input has on the final measurement.
5. Combine the input uncertainties using a method such as root sum squared quadrature combination.

6. The uncertainty can then be expressed in terms of an interval around the measured value with a specified confidence level.

The artificial intelligence engine could substitute predicted values into the uncertainty calculation performed within the base platform 406 or in an external system, to give a quantifiable impact that a potential or real fault is having on the overall system uncertainty. Since the system uncertainty may have a direct impact on a company's or customer's financial exposure, quantifying the impact of a fault is a valuable indicator allowing an operator to allocate and prioritize resources.

The flow computer 307 coupled to the measurement system 306 is configured to calculate the volume, mass and energy flows within a system, using international standards such as ISO, AGA and API. Under certain circumstances, this flow computer 307 functionality may be implemented virtually in the metrology engine 304 or remotely, and regardless of how the flow computer 307 is implemented, its primary calculation function remains the same. The flow computer(s) 307 receive signals from the measurement system 306 using a variety of communication protocols and methods such as Modbus, Open Platform Communications (OPC), Highway Addressable Remote Transducer (HART) protocol, Wireless HART, Foundation Fieldbus, analog and discrete signals, amongst others.

The flow computer 307 typically interfaces with a higher-level metrology engine 304, again using protocols such as Modbus and OPC. The flow computer 307 has the ability to receive diagnostic information from field devices (e.g., the measurement system 306) and monitor the devices for alerts. As a result, the metrology engine 304 may receive diagnostic information from the flow computer 307 in addition to, or in place of a direct connection to the measurement system 306.

The database 410 acts as a data repository for both raw data from the flow computers 307 and measurement system 306, and for the results of the analytics from the artificial intelligence engine 402 and the calculations performed in the base platform 406. For example, the artificial intelligence engine 402 may access the database 410 for dynamic training of the system to tailor its machine learning and deep learning models to be site specific. The artificial intelligence engine 402 may also be configured to periodically pull historical data from the database 410, via the web server 408 and execute a training algorithm. Upon completion of the training algorithm, if performance of the new model exceeds the performance of the currently running model, the artificial intelligence engine 402 may promote the new model for future usage. The artificial intelligence engine 402 may receive data in additional or alternate ways as well, including file transfer, Modbus, and OPC communication protocols. The database 410 may be located on premise, physically close to the artificial intelligence engine 402; alternatively, the database 410 may be hosted in a remote location on a physical or virtual environment.

Figure 5A:
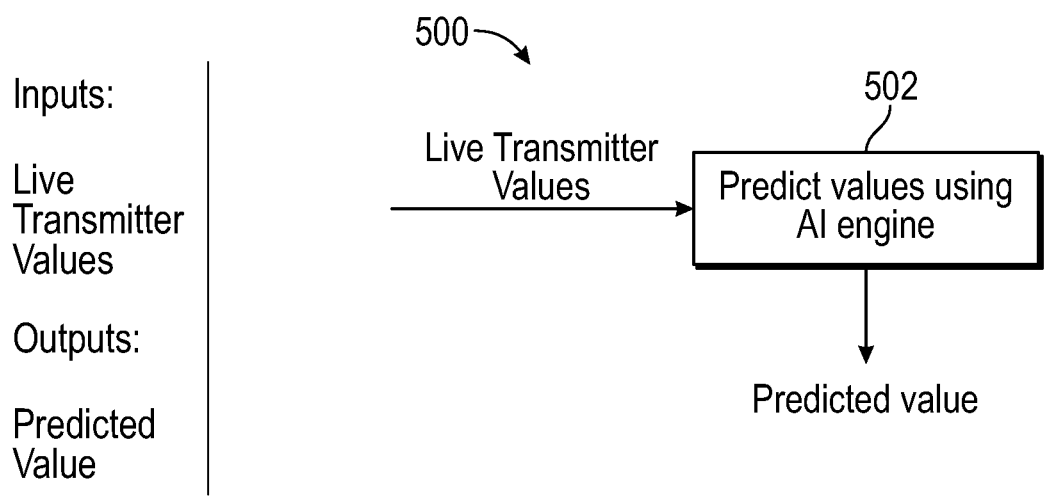
FIGS. 5a-5c show flow diagrams for a method for condition monitoring and failure to a predictive mode in accordance with various embodiments.
Figure 5B:
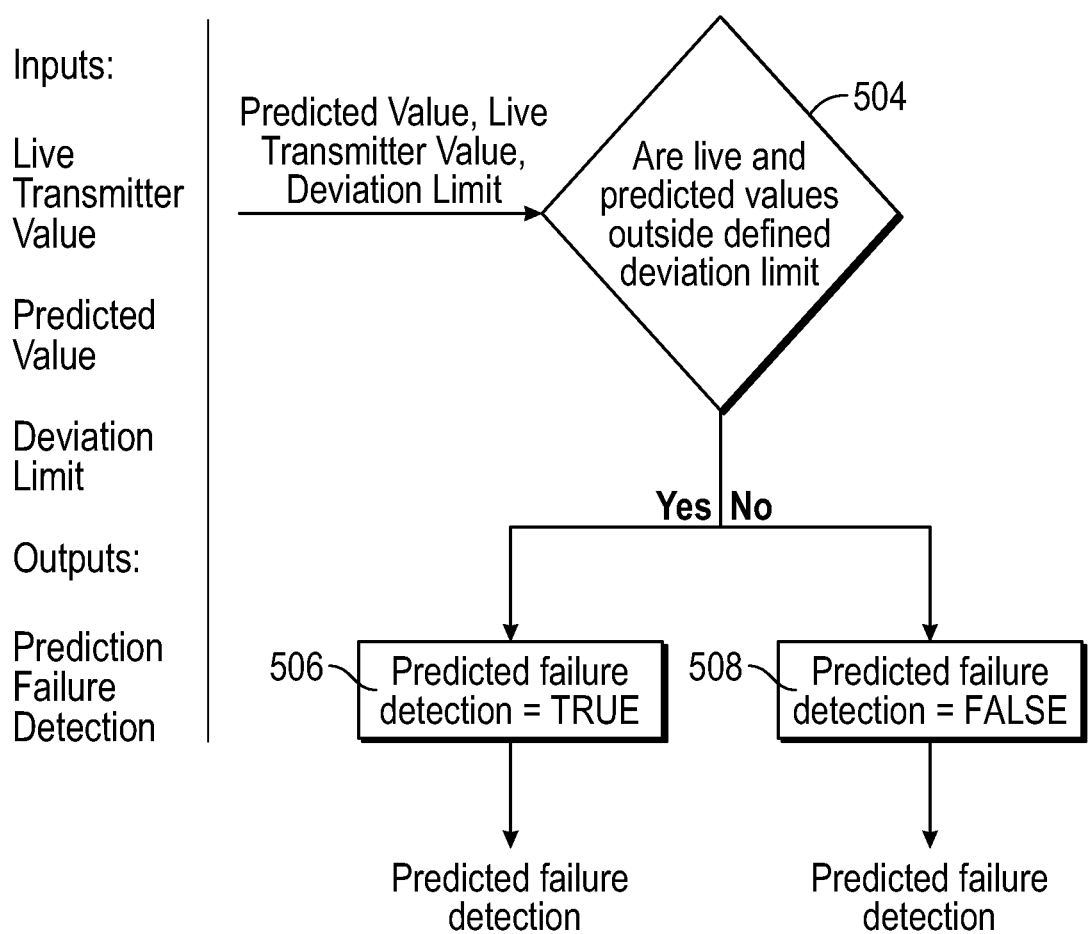
Figure 5C:
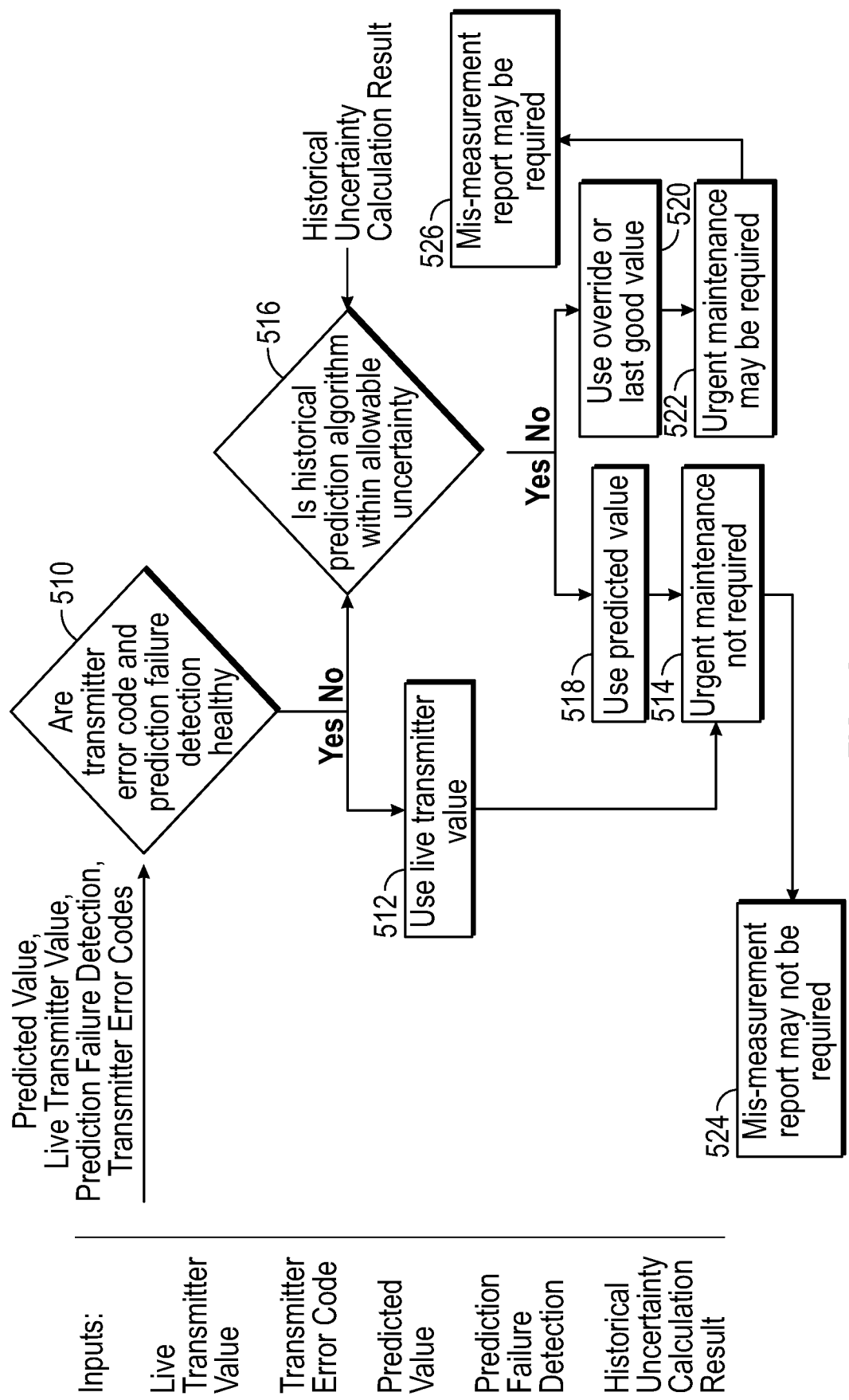

FIGS. 5a-5c show a flow diagram for a method 500 for predicting sensor values for a flow monitoring system in accordance with various examples. Though depicted sequentially as a matter of convenience, at least some of the actions shown can be performed in a different order and/or performed in parallel. Additionally, some examples may perform only some of the actions shown. In some examples, at least some of the operations of the method 500, as well as other operations described herein, can be implemented as instructions stored in computer readable medium and executed by a processor.

In block 502, live values are received from a plurality of sensors of a flow monitoring system, such as a flow meter 101 and sensors 134, 136, 138. For example, the artificial intelligence engine 402 receives live values from the measurement system 306. In block 502, the artificial intelligence engine 402 generates predicted values for the various sensors of the measurement system 306 based on the received live values of the measurement system 306, for example using machine learning and a multilayer perceptron neural network.

Turning to FIG. 5b, the method 500 continues in block 504 with determining whether the live values from the measurement system 306 are outside a defined deviation limit from the predicted values generated by the artificial intelligence engine 402. For example, a live temperature value from a flow metering stream may be compared to a predicted temperature value to determine whether the deviation, calculated as an absolute difference or as a percentage difference between the two values, exceeds a limit. In some examples, the deviation limits are determined based on process conditions, stability, and past performance of the artificial intelligence engine 402. The deviation limits may be entered by a user or automatically adjusted by the artificial intelligence engine 402. For example, if the artificial intelligence engine 402 predicts values for temperature within 2% over a 12-month period, the high and low limits could be set to approximately 2.5%. In the event that the deviation between the live value for a particular sensor and its predicted value is greater than the limit, then the method 500 continues in block 506 in which a predicted failure is detected. On the other hand, in the event that the deviation between the live value for a particular sensor and its predicted value is below the limit, then the method 500 continues in block 508 in which no predicted failure is detected.

In FIG. 5c, the method 500 may continue in block 510 with an assessment of whether a sensor is still healthy. For example, if the predicted failure is not detected in block 508, or a sensor is otherwise determined healthy (e.g., there is no sensor error code received and live values for that sensor are within a tolerable range for that sensor, or sensor type), then the method 500 continues to block 512 and a live value is used, for example by the flow computer for flow calculation purposes. In this event, the method also continues to block 514 in which it is determined that no urgent sensor maintenance is required, and block 524 in which it is determined that no mismeasurement report is required.

On the other hand, if the predicted failure is detected in block 506, or a sensor is otherwise determined unhealthy (e.g., a sensor error code is received, or a live value is outside of a tolerable range for that sensor, or sensor type), then the method 500 continues to block 516 in which it is determined whether the predicted value from the artificial intelligence engine 402 for the failed sensor comprises an allowable uncertainty value. An allowable uncertainty may be determined based on the contractual and regulatory obligations of a specific site, along with the amount of risk deemed acceptable by the operator. For example, a custody transfer measurement system for liquid could have a design-time uncertainty requirement of 0.5%. Thus, if the live uncertainty calculated by the base platform 406 or external system lies within 0.5% including the additional uncertainty of the artificial intelligence engine 402, proceeding to use the predicted value for flow calculations is acceptable. Uncertainties exceeding this limit may still be candidates for using the predicted value (would still be allowable), since the alternative of operator override or last good value are potentially much worse, but in this instance scheduling maintenance and a mismeasurement report may still be required. If the uncertainty is within an allowable range (e.g., below a threshold), then the method 500 continues in block 518 and the predicted value from the artificial intelligence engine 402 is used, for example by the flow computer for flow calculation purposes. As above where a live value is used in block 512, the method 500 then continues to block 514 in which it is determined that no urgent sensor maintenance is required, and block 524 in which it is determined that no mismeasurement report is required.

On the other hand, if the uncertainty is outside the allowable range (e.g., above the threshold), then the method 500 continues in block 520 in which another failure mode is utilized. For example, a user-defined value for that particular sensor or sensor type may be used, for example by the flow computer for flow calculation purposes. In another example, the last good live value received from that particular sensor may be used, for example by the flow computer for flow calculation purposes. In this case, since the predicted value from the artificial intelligence engine 402 was not able to be used, remedial action regarding the failed sensor may be taken in block 522, such as scheduling maintenance of the sensor or ordering a replacement sensor. The method 500 further continues in block 526 with generating a mismeasurement report that provides an audit trail of the fault, the corrective action taken and the reconciled production figures for that period of time. In some examples, the mismeasurement report may be generated using predicted values from the artificial intelligence engine 402. For example, if one sensor of the measurement system 306 is determined to have failed but the other sensors of the measurement system 306 are healthy, the live values (e.g., retrospective live values) of the healthy sensors are received by the artificial intelligence engine 402 and used to generate predicted values (e.g., retrospective predicted values) for the failed sensor, which can then be used in the mismeasurement report to approximate flow calculations during the period of sensor failure.

Figure 6:
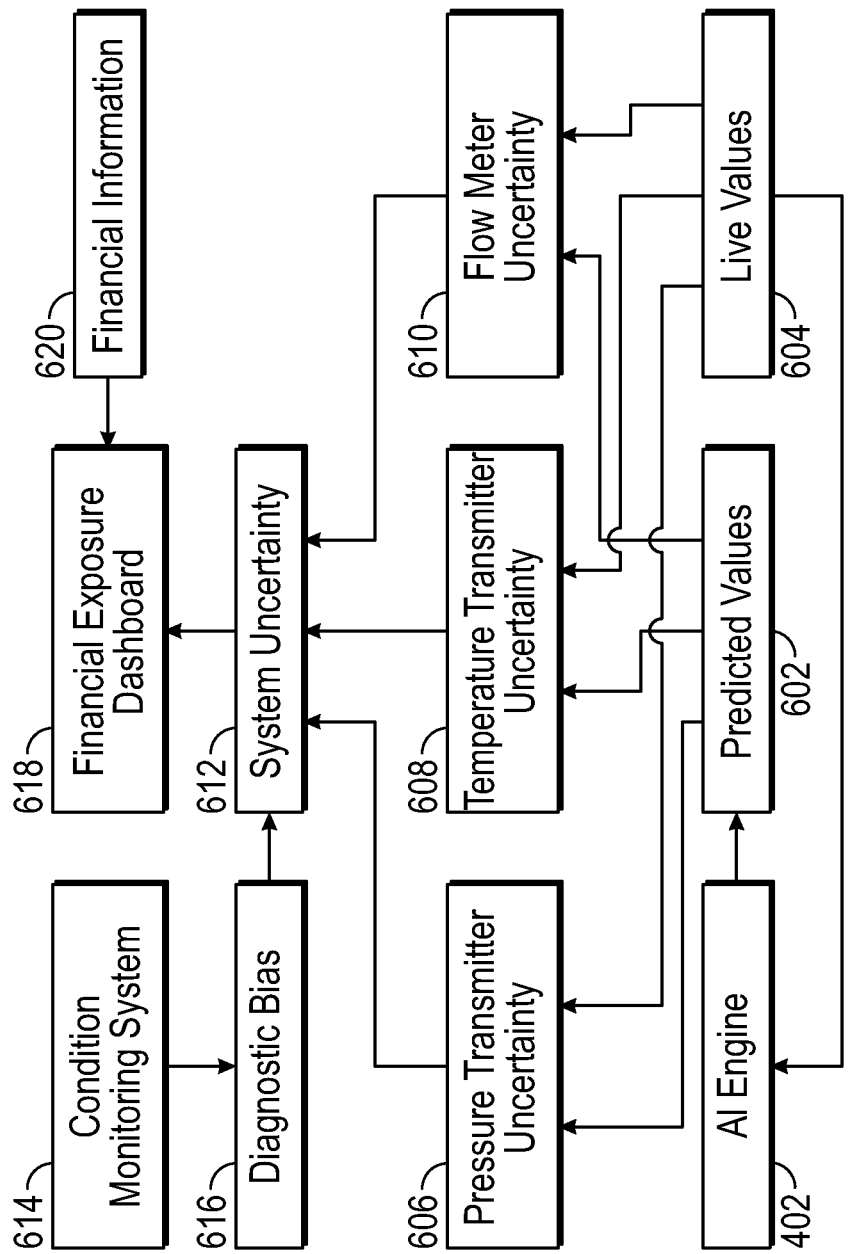
FIG. 6 shows a relationship of different variables that give rise to a determination of customer financial exposure when using a flow monitoring system in accordance with various embodiments.

FIG. 6 shows a relationship of different variables that give rise to a determination of customer financial exposure when using a flow monitoring system as described above. For example, as explained above, the artificial intelligence engine 402 generates predicted values 602 for sensors of the measurement system (not shown in this figure) based on live values 604 of sensors of the measurement system. The predicted values 602 and the live values 604 are used to calculate, for example, pressure transmitter uncertainty 606, temperature transmitter uncertainty 608, and flow meter uncertainty 610. Other sensor uncertainties, or uncertainties for multiple sensors of the same type may also be calculated, but are not shown in this figure for brevity.

The pressure transmitter uncertainty 606, temperature transmitter uncertainty 608, and flow meter uncertainty 610 are in turn used to calculate a system uncertainty 612. The system uncertainty 612 may additionally consider a diagnostic bias element 616 that is generated by the condition monitoring system 614. That is, the additional uncertainty that may have been introduced by a potential malfunction in accordance with GUM section 3.2.3. For example, if a temperature sensor was identified as being potentially faulty, the uncertainty model derived at design-time or dynamically at the site specifies the overall impact that temperature has on the flow calculation. A dynamic uncertainty can thus be calculated by the metrology engine 304, or by an external system, using the live temperature in relation to the predicted value for that temperature sensor. If the calculated increase in uncertainty results in the overall flow calculation or measurement failing to meet contractual or regulatory requirements, the user may use this quantitative information to make an informed decision on the appropriate remedial action (e.g., repair or recalibration). Together with a customer's financial information 620 from their business systems, the live system uncertainty 612 in conjunction with the market value of the product is used to calculate an overall financial exposure in dollars or local currency, which may be displayed, for example, in a dashboard view at a customer location. This exposure information can be used to prioritize operation expenditure in the form of maintenance and repairs, and plan for future capital expenditures to upgrade or replace systems that underperform.

The above discussion is meant to be illustrative of the principles and various exemplary embodiments of the present invention. Numerous variations and modifications will become apparent to those skilled in the art once the above disclosure is fully appreciated. For example, while embodiments of the invention have been described with regard to an ultrasonic flow meter, those skilled in the art understand that embodiments are equally applicable to other types of flow meters. It is intended that the following claims be interpreted to embrace all such variations and modifications.

What is claimed is:

1. A flow metering system, comprising:
   a flow meter coupled to a plurality of sensors and configured to measure volume of fluid flowing through the flow meter; and
   a metrology computer coupled to the flow meter and the sensors and configured to:
   receive live values from a plurality of sensors during a first time period;
   train an artificial intelligence engine based on the live values received during the first time period;
   in response to detecting a sensor failure, determine an uncertainty of a predicted value for the sensor, wherein the predicted value is based on live values from other of the plurality of sensors and the artificial intelligence engine; and
   in response to the uncertainty being below a threshold, use the predicted value in a flow calculation.

2. The flow metering system of claim 1, wherein the metrology computer is further configured to:
   predict a future trend in sensor values based on the live values and the trained artificial intelligence engine; and
   identify an impending failure of one of the sensors.

3. The flow metering system of claim 2, wherein the metrology computer is further configured to calculate a probability of impending failure of the sensor when the metrology computer identifies the impending failure.

4. The flow metering system of claim 1, wherein the metrology computer is further configured to determine and display a remedial action in response to the uncertainty being above the threshold.

5. A method for monitoring operation of a flow meter, comprising:
   receiving, by a metrology computer, live values from a plurality of sensors during a first time period;
   training an artificial intelligence engine based on the live values received during the first time period;
   in response to detecting a sensor failure, determining, by the metrology computer an uncertainty of a predicted value for the sensor, wherein the predicted value is based on live values from other of the plurality of sensors and the artificial intelligence engine; and
   in response to the uncertainty being below a threshold, using, by the metrology computer, the predicted value in a flow calculation.

6. The method of claim 5, further comprising performing a remedial action for the sensor experiencing the failure in response to the uncertainty being above the threshold.

7. The method of claim 6, wherein the remedial action comprises at least one selected from the group consisting of: scheduling maintenance for the sensor; ordering a replacement sensor; and replacing the sensor.

8. A non-transitory, computer-readable medium containing instructions that, when executed by a processor, cause the processor to perform the method of claim 5.

* * * * *